United States Patent
Takase

(10) Patent No.: US 9,310,203 B2
(45) Date of Patent: Apr. 12, 2016

(54) PHYSICAL QUANTITY SENSOR

(75) Inventor: Yasuhide Takase, Tokyo (JP)

(73) Assignee: CITIZEN HOLDINGS CO., LTD., Tokyo (JP)

(*) Notice: Subject to any disclaimer, the term of this patent is extended or adjusted under 35 U.S.C. 154(b) by 620 days.

(21) Appl. No.: 13/638,226

(22) PCT Filed: Mar. 30, 2011

(86) PCT No.: PCT/JP2011/058657
§ 371 (c)(1),
(2), (4) Date: Dec. 5, 2012

(87) PCT Pub. No.: WO2011/126033
PCT Pub. Date: Oct. 13, 2011

(65) Prior Publication Data
US 2013/0068019 A1 Mar. 21, 2013

(30) Foreign Application Priority Data

Mar. 31, 2010 (JP) ................ 2010-083389
Aug. 26, 2010 (JP) ................ 2010-189555

(51) Int. Cl.
*G01C 19/5776* (2012.01)
*G01C 19/56* (2012.01)
*G01P 15/14* (2013.01)

(52) U.S. Cl.
CPC ........... *G01C 19/5776* (2013.01); *G01C 19/56* (2013.01); *G01P 15/14* (2013.01)

(58) Field of Classification Search
USPC .................................. 73/504.12
See application file for complete search history.

(56) References Cited

U.S. PATENT DOCUMENTS

| 7,439,892 B1* | 10/2008 | Schneider et al. ........... 341/143 |
| 2005/0081635 A1* | 4/2005 | Kobayashi ...................... 73/580 |
| 2008/0126015 A1* | 5/2008 | Hammerschmidt .......... 702/189 |
| 2009/0066550 A1 | 3/2009 | Hammerschmidt |

FOREIGN PATENT DOCUMENTS

| JP | 2002-208824 | 7/2002 |
| JP | 2006-238501 | 9/2006 |

(Continued)

OTHER PUBLICATIONS

International Search Report from the Japanese Patent Office, mailed Jun. 21, 2011, for International Application No. PCT/JP2011/058657.

*Primary Examiner* — Hezron E Williams
*Assistant Examiner* — Mark A Shabman
(74) *Attorney, Agent, or Firm* — Finnegan, Henderson, Farabow, Garrett & Dunner, L.L.P.

(57) ABSTRACT

An object of the invention is to provide a physical quantity sensor capable of producing a highly accurate physical quantity detection signal. The physical quantity sensor has an oscillator for converting an externally applied physical quantity into an electrical signal, an oscillation circuit which makes the oscillator oscillate, and a detector circuit for detecting a to-be-detected signal output from the oscillator by using a detection signal output from the oscillation circuit, includes a delta-sigma modulator, preceding the detector circuit, for delta-sigma modulating either one of the detection signal output from the oscillation circuit and the to-be-detected signal output from the oscillator, and for outputting a modulated signal, a variable voltage source capable of varying an output voltage, and a control unit for controlling the output voltage of the variable voltage source, and wherein the delta-sigma modulator performs the delta-sigma modulation by using a feedback signal created based on the output voltage.

7 Claims, 10 Drawing Sheets

(56) References Cited

FOREIGN PATENT DOCUMENTS

| | | |
|---|---|---|
| JP | 2007-057340 | 3/2007 |
| JP | 2008-507713 | 3/2008 |
| JP | 2008-206134 | 9/2008 |
| JP | 2008-309527 | 12/2008 |
| JP | 2010-54438 | 3/2010 |

* cited by examiner

PRIOR ART

PHYSICAL QUANTITY SENSOR

TECHNICAL FIELD

The present invention relates to a physical quantity sensor that uses delta-sigma modulation.

BACKGROUND

It is known in the art to provide a gyro sensor using a piezoelectric crystal oscillator for use as a physical quantity sensor for attitude control of a car navigation system, robot, etc. (for example, refer to patent document 1).

FIG. 1 is a diagram showing one example of a prior art gyro sensor.

As shown in FIG. 1, gyro sensor 1 comprises an oscillation circuit 3, which includes a crystal oscillator 2 having detection electrodes 5 and 6, and a detection circuit 10 for detecting a Coriolis force based on detection signals supplied from detection electrodes 5 and 6. Detection electrodes 5 and 6 are formed on a detection tine of crystal oscillator 2 and, based on the outputs from the driving electrodes formed on a driving tine of crystal oscillator 2, oscillation circuit 3 performs binarization and outputs a detection clock CL in the form of a rectangular wave.

Crystal oscillator 2 continues to oscillate with a constant amplitude under the control of oscillation circuit 3; if, at this time, crystal oscillator 2 is rotated with an angular velocity ω, a Coriolis force F proportional to the angular velocity ω acts at right angles to the direction of vibration of the driving tine of crystal oscillator 2. Then, due to the stress induced by the Coriolis force F, crystal oscillator 2 is set into vibration at a frequency equal to the drive frequency, as a result of which electrical charges due to the piezoelectric effect are set up on detection electrodes 5 and 6 formed on the detection tine.

These charges cause detection currents I1 and I2, very small currents of opposite phases, to flow in detection electrodes 5 and 6, respectively. I/V conversion circuits 11 and 12 in detection circuit 10 convert detection currents I1 and I2 into detection voltages V10 and V11, respectively, and a differential amplifier 13 amplifies the difference between detection voltages V10 and V11, and thus produces a difference output V12. A synchronous detection circuit 14 takes difference output V12 as input, performs synchronous detection by synchronizing the timing with the detection clock CL output as a rectangular wave from oscillation circuit 3, and produces a detection output V13. A low-pass filter (LPF) 15 cuts off the AC component of detection output V13, and outputs an angular velocity detection signal V14 which is a DC voltage proportional to the angular velocity.

FIG. 2 is a diagram showing signal examples in synchronous detection circuit 14.

FIG. 2(a) shows the case where the difference output V12 of the differential amplifier 13 is input to the synchronous detection circuit 14, FIG. 2(b) shows the case where noise 1 at twice the frequency of difference output V12 is input to synchronous detection circuit 14, and FIG. 2(c) shows the case where noise 2 at three times the frequency of difference output V12 is input to synchronous detection circuit 14.

As shown in FIG. 2(a), difference output V12 is detected with the detection clock CL to produce detection output V13 whose AC component is then cut off by LPF 15, producing the angular velocity detection signal V14, which is a DC voltage having a certain value.

As shown in FIG. 2(b), when noise 1 at twice the frequency of the difference output V12 is input to synchronous detection circuit 14, noise 1 is detected by the detection clock CL, but since synchronous detection output V13 in this case has an upper-lower symmetrical waveform, the output that LPF 15 produces by cutting off the AC becomes zero, hence no ill effect on the angular velocity detection signal V14. On the other hand, as shown in FIG. 2(c), when noise 2 at three times the frequency of difference output V12 is input to synchronous detection circuit 14 and detected by detection clock CL, resulting synchronous detection output V13 has an upper-lower asymmetrical waveform; as a result, even if the AC is cut off by the LPF 15, the DC component, and hence noise, remains in angular velocity detection signal V14. While FIG. 2(c) has been described for the case where noise at three times the difference output V12 is input, the same problem occurs when harmonic noise at an odd multiple of the frequency of the difference output V12 is input.

That is, there has been the problem that when harmonic noise superimposed on the detection signal is input to the synchronous detection circuit, the angular velocity detection signal is affected by the noise.

Patent document: Japanese Unexamined Patent Publication No. 2007-57340 (FIG. 9)

SUMMARY

It is an object of the present invention to provide a physical quantity sensor aimed at solving the above problem.

It is another object of the present invention to provide a physical quantity sensor capable of producing a highly accurate physical quantity detection signal.

It is also an object of the present invention to provide a physical quantity sensor capable of producing a highly accurate angular velocity detection signal.

The physical quantity sensor having an oscillator for converting an externally applied physical quantity into an electrical signal, an oscillation circuit for causing the oscillator to oscillate, and a detector circuit for detecting a to-be-detected signal output from the oscillator by using a detection signal output from the oscillation circuit, includes a delta-sigma modulator, preceding the detector circuit, for delta-sigma modulating either one of the detection signal output from the oscillation circuit and the to-be-detected signal output from the oscillator, and for outputting a modulated signal, a variable voltage source capable of varying an output voltage, and a control unit for controlling the output voltage of the variable voltage source, and wherein the delta-sigma modulator performs the delta-sigma modulation by using a feedback signal created based on the output voltage.

A gyro sensor includes an oscillator, an oscillation circuit for causing the oscillator to oscillate, a delta-sigma modulator for delta-sigma modulating either one of a detection signal output from the oscillation circuit and a to-be-detected signal output from the oscillator, a detector circuit for detecting, based on the output signal of the delta-sigma modulator, the other one of the detection signal output from the oscillation circuit and the to-be-detected signal output from the oscillator, and a low-pass filter for removing an AC component from an output signal of the detector circuit.

Preferably, in the gyro sensor, the detector circuit further includes a first switching circuit for outputting, based on the output signal of the delta-sigma modulator, either one of the to-be-detected signal supplied from the oscillator and an inverted version of the to-be-detected signal.

Preferably, the gyro sensor further includes a constant voltage source, and a second switching circuit for outputting, based on the output signal of the delta-sigma modulator, either one of a voltage signal supplied from the constant voltage source and an inverted version of the voltage signal, and wherein the delta-sigma modulator uses the output signal of the second switching circuit as a feedback signal.

According to the physical quantity sensor, since the reference voltage is variable, it is possible to provide the physical quantity sensor with a variable gain amplification function (sensitivity compensation function). Furthermore, since there is no need to provide a dedicated variable gain amplifier circuit, it also becomes possible to prevent problems such as the generation of noise and an increase in the amount of circuitry associated with the provision of a dedicated circuit.

According to the physical quantity sensor, since the ambient temperature of the oscillator is detected, and the reference voltage is varied based on the result of the detection, it is possible to provide the physical quantity sensor with a temperature compensation function.

According to the gyro sensor, since the modulated signal produced by delta-sigma modulating either one of the detection signal output from the oscillation circuit and the to-be-detected signal output from the oscillator is used to detect the other one of the detection signal output from the oscillation circuit and the to-be-detected signal output from the oscillator, it is possible to obtain a highly accurate angular velocity detection signal without being affected by harmonics superimposed on the detection signal.

Furthermore, according to the gyro sensor, by generating the feedback signal using the constant voltage source, an angular velocity detection signal unaffected by variations in supply voltage can be obtained.

DESCRIPTION OF EMBODIMENTS

A physical quantity sensor will be described below with reference to the drawings. It will, however, be noted that the technical scope of the present invention is not limited to the specific embodiments described herein but extends to the inventions described in the appended claims and their equivalents.

Figure 3:
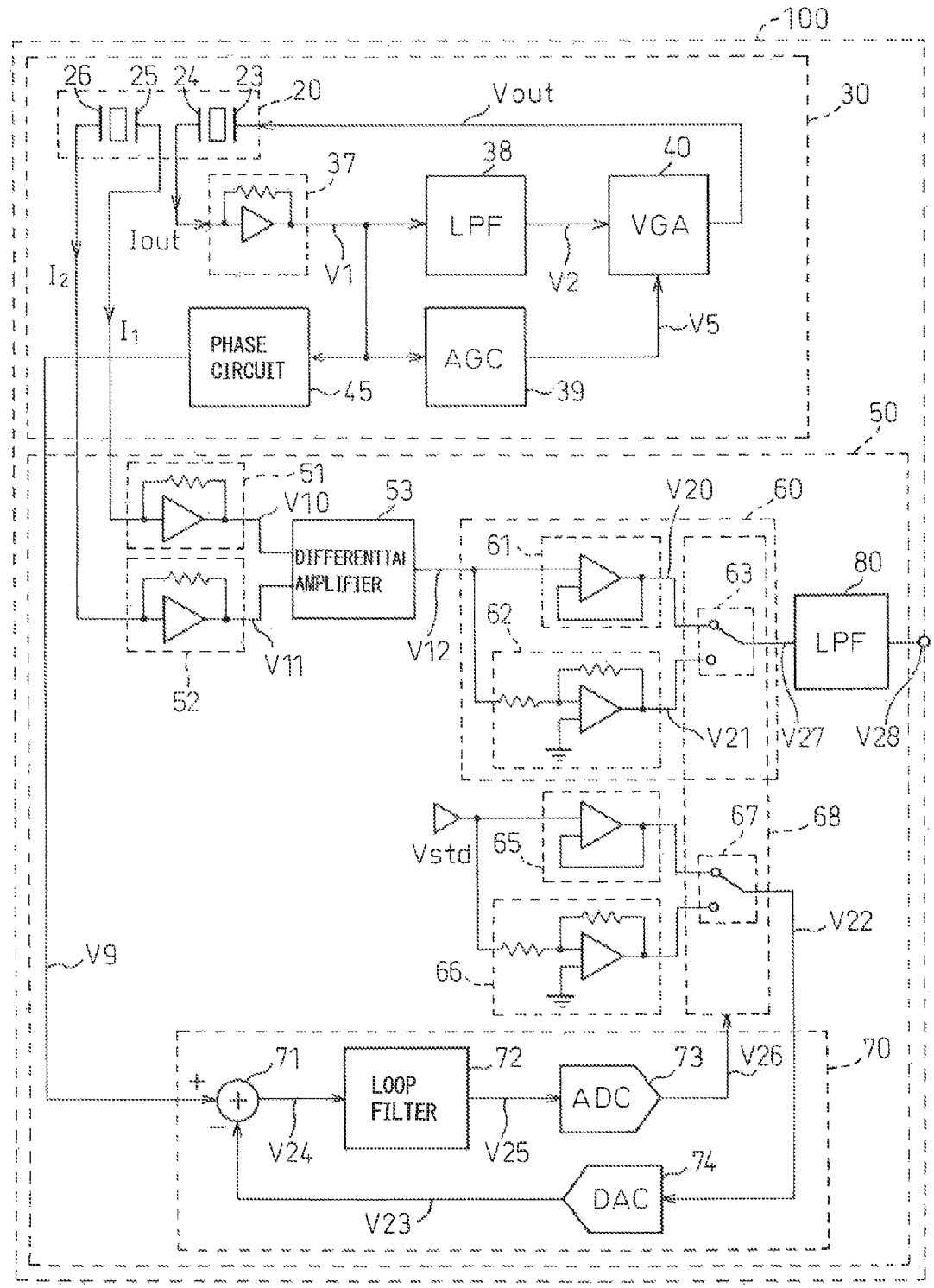
FIG. 3 is a diagram showing a gyro sensor 100 as an example of a physical quantity sensor.

FIG. 3 is a diagram showing a gyro sensor 100 as an example of the physical quantity sensor.

The gyro sensor 100 includes an oscillation circuit 30 and a detection circuit 50, and the detection circuit 50 is constructed to output an angular velocity detection signal V28.

The oscillation circuit 30 includes a crystal oscillator 20, an I/V conversion circuit 37, an LPF 38, an automatic gain control circuit (AGC) 39, a variable gain amplifier (VGA) 40, and a phase circuit 45.

Figure 4:
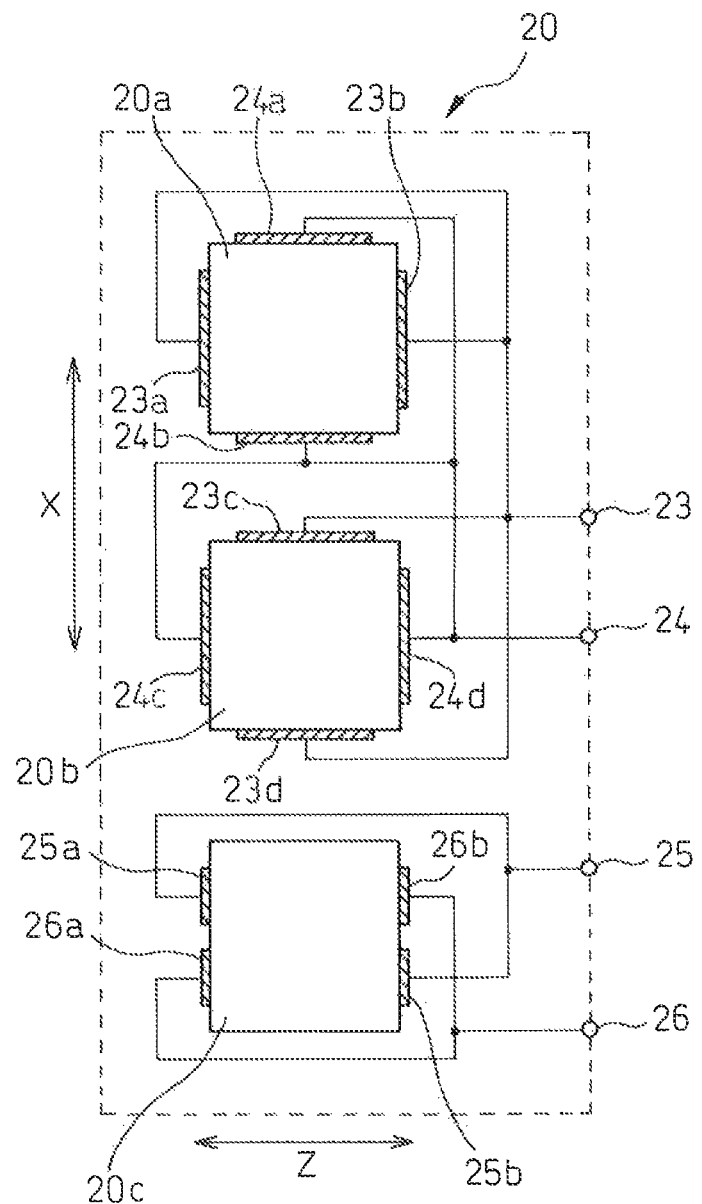
FIG. 4 is a diagram showing how various electrodes are connected to a crystal oscillator.

FIG. 4 is a diagram showing how various electrodes are connected to the crystal oscillator.

The crystal oscillator 20 is a three-tined oscillator having three tines, i.e., two driving tines 20a and 20b and one detection tine 20c. Driving electrodes 23 and 24 are formed in pairs on each of the driving tines 20a and 20b. When an AC drive voltage Vout is applied to the driving electrode 23, the crystal oscillator 20 is set into vibration, and an AC output current Iout is output from the driving electrode 24. The structure of the crystal oscillator 20 is not limited to the three-tined oscillator of the type shown in FIG. 4, but other suitable types of three-tined oscillator or two-tined tuning-fork oscillators or the like may be used. Further, the material for the oscillator is not limited to a crystal, but an piezoelectric material such as PZT may be used.

The driving electrode 23 includes driving electrodes 23a and 23b formed on two opposite sides of the driving tine 20a and driving electrodes 23c and 23d formed on two opposite sides of the driving tine 20b. Likewise, the driving electrode 24 includes driving electrodes 24a and 24b formed on the other two opposite sides of the driving tine 20a and driving electrodes 24c and 24d formed on the other two opposite sides of the driving tine 20b. The driving electrodes 23a, 23b, 23c, and 23d are electrically coupled together and connected as the driving electrode 23 to the outside, while the driving electrodes 24a, 24b, 24c, and 24d are electrically coupled together and connected as the driving electrode 24 to the outside.

Detection electrodes 25 and 26 are formed in pairs on the detection tine 20c. The detection electrode 25 includes detection electrodes 25a and 25b formed on designated portions on opposite sides of the detection tine 20c. Likewise, the detection electrode 26 includes detection electrodes 26a and 26b formed on other designated portions on the opposite sides of the detection tine 20c. The detection electrodes 25a and 25b are electrically coupled together and connected as the detection electrode 25 to the outside, while the detection electrodes 26a and 26b are electrically coupled together and connected as the detection electrode 26 to the outside.

The I/V conversion circuit 37 in the oscillation circuit 30 takes as input the output current Iout flowing out of the driving electrode 24 of the crystal oscillator 20, and outputs an AC signal V1. The LPF 38 takes the AC signal V1 as input and outputs a filter output signal V2. The AGC 39 takes the AC signal VT as input, compares it with a predetermined reference voltage, and outputs a control voltage V5. The VGA 40 takes the filter output signal V2 as input, and outputs, in response to the control voltage V5, the drive voltage Vout which is applied to the driving electrode 23 of the crystal oscillator 20.

The phase circuit 45 outputs a detection signal V9 after adjusting the phase of the AC signal V1 so that the phase difference between the phase of the detection signal V9 and the phase of the currents I1 and I2 as the signals to be detected becomes 0°. Alternatively, the phase circuit 45 may be configured to output the detection signal V9 based on the drive voltage Vout.

With the above configuration of the oscillation circuit 30, the crystal oscillator 20 is driven by the drive voltage Vout and continues to self-oscillate. As the crystal oscillator 20 continues to oscillate, the driving tines 20a and 20d vibrate in direction X (see FIG. 4), and the detection tine 20c vibrates in the same direction X synchronously with the driving tines 20a and 20d.

The detection circuit 50 comprises I/V conversion circuits 51 and 52, a differential amplifier 53, a detector circuit 60, a second buffer 65 and a second inverting amplifier 66 both connected to a reference power supply (not shown), a second switch 67 which operates to select one or the other of the outputs of the second buffer 65 and second inverting amplifier 66, a switch control unit 68, a sigma-delta modulator 70, and an LPF 80.

Figure 5:
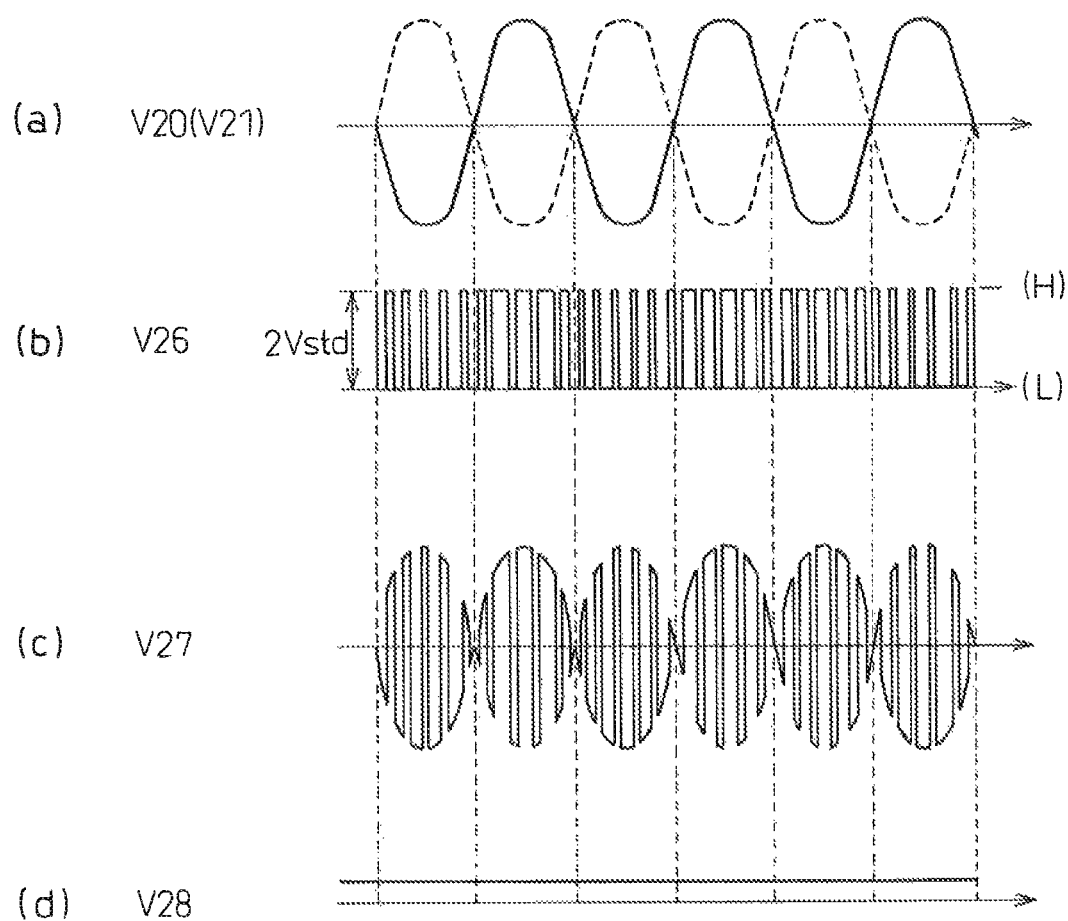
FIG. 5 is a diagram showing signal examples in the gyro sensor 100.

The detector circuit 60 includes a first buffer 61 and a first inverting amplifier 62 both connected to the differential amplifier 53, and a first switch 63 which operates to select one or the other of the outputs of the first buffer 61 and first inverting amplifier 62. The delta-sigma modulator 70 includes an adder 71, a loop filter 72, an A/D converter 73, and a D/A converter 74. The A/D converter may be a single-bit converter, in which case the D/A converter 74 may be omitted. FIG. 5 shows waveforms when the A/D converter is a single-bit converter.

The crystal oscillator 20 continues to oscillate with a constant amplitude under the control of the oscillation circuit 30; if, at this time, the crystal oscillator 20 is rotated with an angular velocity w, a Coriolis force F proportional to the angular velocity a) acts in direction Z at right angles to the direction of vibration (direction X) of the driving tines 20a and 20b of the crystal oscillator 20 (see FIG. 4). The Coriolis force F is expressed as F=2·m·ω·V, where m represents the equivalent mass of the driving tines 20a and 20b or the detection tine 20c, and V represents the velocity oscillating at the drive frequency f0 (Hz). Due to the stress induced by the Coriolis force F, the crystal oscillator 20 is set into vibration at a frequency equal to the drive frequency, as a result of which electrical charges due to the piezoelectric effect are set up on the detection electrodes 25 and 26 formed on the detection tine.

These electrical charges cause the detection currents I1 and I2, very small currents of opposite phases, to flow in the detection electrodes 25 and 26, respectively. The I/V conversion circuits 51 and 52 in the detection circuit 50 convert the detection currents I1 and I2 into detection voltages V10 and V11, respectively, and the differential amplifier 53 amplifies the difference between the detection voltages V10 and V11 to provide a difference output V12.

The first buffer 61 in the detector circuit 60 takes the difference output V12 as input and produces an output V20 which is the same as the difference output; on the other hand, the first inverting amplifier 62 inverts the difference output V12 to produce an inverted output V21. Similarly, the second buffer 65 takes as input a reference voltage signal (Vstd) from the reference power supply and produces an output signal which is the same as the reference voltage signal; on the other hand, the second inverting amplifier 66 produces an output signal by inverting the reference voltage signal.

The output selected by the second switch 67 is supplied to the D/A converter 74 and converted into an analog signal. V23 which is applied to the adder 71. The adder 71 subtracts the analog signal V23 from the detection signal V9 output from the phase circuit 45 in the oscillation circuit 30, and outputs the result as a subtraction output signal V24. The loop filter 72 takes the subtraction output signal V24 as input, integrates this signal, and outputs the result as a filter output signal V25. The A/D converter 73 converts the filter output signal V25 into a digital signal V26 for output.

When the digital signal V26 is high, the switch control unit 68 controls the first switch 63 to select the output V20 of the first buffer 61 and controls the second switch 67 to select the output of the second buffer 65. When the digital signal V26 is low, the switch control unit 68 controls the first switch 63 to select the output V21 of the first inverting amplifier 62 and controls the second switch 67 to select the output of the second inverting amplifier 66.

FIG. 5 is a diagram showing signal examples in the gyro sensor 100.

In FIG. 5(a), the output V20 of the first buffer 61 is indicated by a solid line, while the output V21 of the first inverting amplifier 62 is indicated by a dashed line. The voltage waveform of the output V20 is the same as that of the difference output V12 of the differential amplifier 53, and corresponds to the signal detected based on the signals output from the detection tine 20c of the crystal oscillator 20.

The output of the A/D converter 73 in the delta-sigma modulator 70 is applied as a control signal to the second switch 67 which is thus operated to switch at a rate sufficiently higher than the detection signal V9, and its output V22 is converted by the D/A converter into an analog signal to produce the D/A converter output signal V23. The adder 71 compares the detection signal V9 with the output V23 of the D/A converter 74, the difference is integrated by the loop filter 72, and the result is fed back to the A/D converter 73.

In this way, the delta-sigma modulator 70 creates the delta-sigma modulated digital signal. V26 (see FIG. 5(b)) from the detection signal V9 output from the phase circuit 45 in the oscillation circuit 30. The voltage value when the digital signal V26 is high is approximately equal to the voltage Vstd of the reference power supply. The switch control unit 68 controls the switching operation of the first switch 63 based on the digital signal V26 output from the A/D converter 73; this is equivalent to synchronously detecting the difference signal V12, i.e., the signal to be detected, by using the digital signal V26. The LPF 80 removes the AC component from the output signal V27 (see FIG. 5(c)) of the first switch 63 and outputs the angular velocity detection signal V28 (see FIG. 5(d)) which is a DC voltage proportional to the angular velocity.

Figure 1:
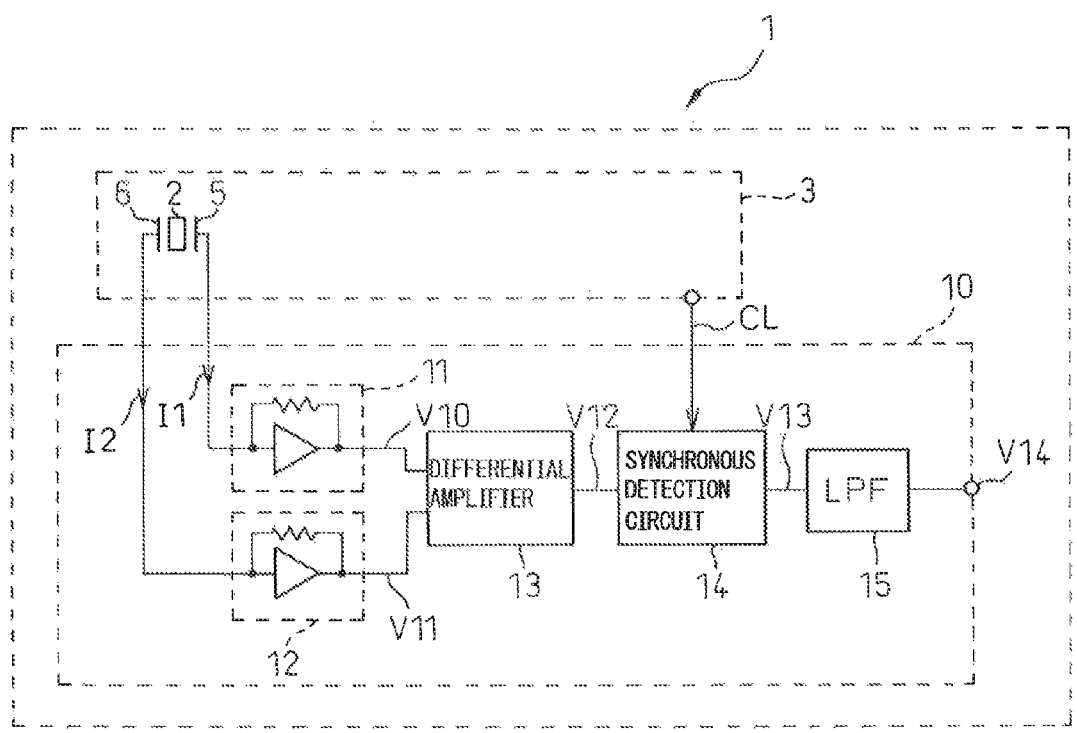
FIG. 1 is a diagram showing one example of a prior art gyro sensor.
Figure 2:
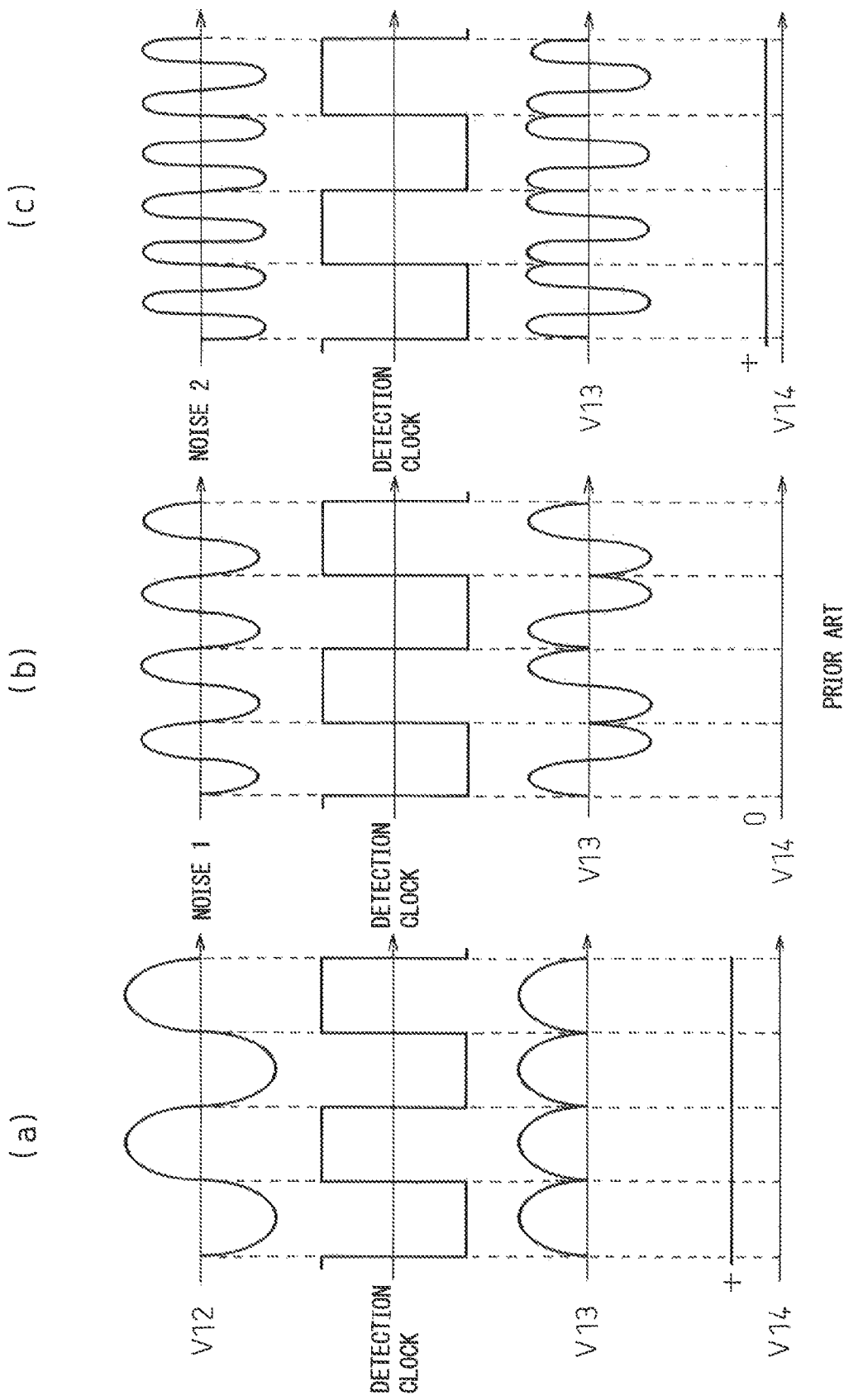
FIG. 2 is a diagram showing signal examples in a synchronous detection circuit 14 in the gyro sensor shown in FIG. 1.

The digital signal V26 output from the A/D converter 73 is produced by converting the detection signal V9 into digital form, and does not contain any particular frequency component other than the detection signal V9 and the sampling frequency of the A/D converter 73. Accordingly, even when an odd-order harmonic of V9 is superimposed on the detection signal, as previously described with reference to FIG. 2(c), it will, have very little effect on the angular velocity detection signal V28.

From the circuit configuration of the detection circuit 50, it is considered that the following equation holds.

$$((LV9-LV22 \cdot DA) \cdot LF+E) \cdot LVstd=LV22$$

hence $$LV22=LV9 \cdot LF \cdot Vstd/(1+DA \cdot LF \cdot Vstd)+E \cdot Vstd/(1+DA \cdot LF \cdot Vstd)$$

IF represents the transfer function of the loop filter 72, DA the transfer function of the D/A converter 74, e the quantization noise in the A/D converter 73, and E the result of the Laplace transform of the quantization noise e. Further, LV27 represents the result of the Laplace transform of the output signal V27 of the first switch 63, LV22 the result of the Laplace transform of the output signal V22 of the second switch 67, and LV9 the result of the Laplace transform of the detection signal V9.

In the above equation, if DA·LF·Vstd>>1, then LV22≈LV9/DA; assuming that DA≈1, the following equation holds.

$$LV22 \approx LV9 \quad (1)$$

Further, based on the similarity between the detector circuit 60 and the circuit comprising the second buffer 65 and second inverting amplifier 66 connected to the reference power supply and the second switch 67, it is apparent that the relationship between LV12 and LV27 is the same as the relationship between Vstd and LV22; therefore, the relation defined by the following equation (2) holds.

$$LV27 = LV12 \cdot LV22/Vstd \quad (2)$$

From the equations (1) and (2), the relation defined by the following equation (3) holds.

$$LV27 = LV9 \cdot LV12/Vstd \quad (3)$$

Thus, it can be understood that the output signal V27 of the first switch 63 in the detection circuit 50 is proportional to the product of the detection signal V9 and the difference signal V12 to be detected.

In the above gyro sensor 100, since the synchronous detection is performed by using the digital signal that is converted from the detection signal V9 by the delta-sigma modulator 70, errors can be prevented from occurring in the angular velocity detection signal V28 due to harmonics induced by such factors as periodic external mechanical vibrations, etc. Furthermore, since the detection is performed by using the switching of the first switch 63, there is also offered the advantage that the entire gyro sensor 100 can be implemented in CMOS.

It should also be noted that the gyro sensor 100 uses the delta-sigma modulator 70; in the case of delta-sigma modulation, by suitably setting the loop filter 72, quantization noise can be shifted toward higher frequencies, reducing the noise at lower frequencies (noise shaving). This offers the advantage that the quantization noise of the A/D converter 73, superimposed on the detected low-frequency components important to the gyro sensor, can be reduced.

Figure 6:
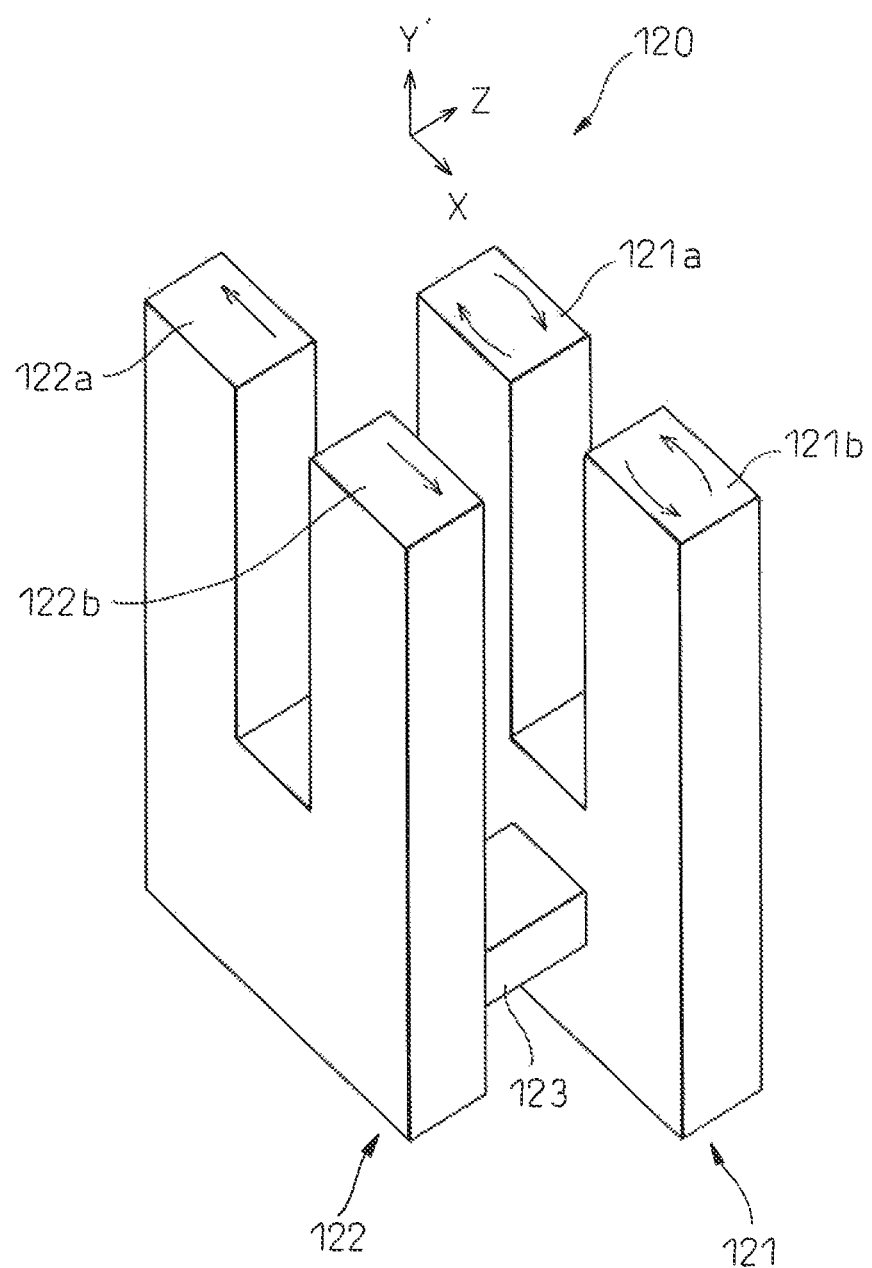
FIG. 6 is a diagram showing an example of an acceleration sensor device that can be applied to the physical quantity sensor.

FIG. 6 is a diagram showing an example of an acceleration sensor device that can be applied to the physical quantity sensor.

The device 120 shown in FIG. 6 comprises a first tuning-fork crystal oscillator 121, a second tuning-fork crystal oscillator 122, and a base joint 123. The first tuning-fork crystal oscillator 121 on the driving side include a first driving tine 121a and a second driving tine 121b, and the second tuning-fork crystal oscillator 122 on the detection side include a first detection tine 122a and a second detection tine 122b.

When an AC voltage is applied across the driving electrodes of the first tuning-fork crystal oscillator 121, the first driving tine 121a and the second driving tine 121b are caused to vibrate in such a manner as to twist about the Y' axis in opposite phase to each other and continue to vibrate in this fashion. In this condition, when acceleration occurs in the direction of ±Z axis symmetrical about the XY plane, vibrations of another mode are generated in the first driving tine 121a and the second driving tine 121b due to Coriolis forces. The generated vibrations are propagated via the base joint 123 to the second tuning-fork crystal oscillator 122 on the detection side. The propagated vibrations cause the first detection tine 122a and second detection tine 122b of the second tuning-fork crystal oscillator 122 to vibrate in such a manner as to twist about the Y' axis in opposite phase to each other. An acceleration signal proportional to the acceleration can be obtained by detecting the AC signal generated by the vibrations.

Figure 7:
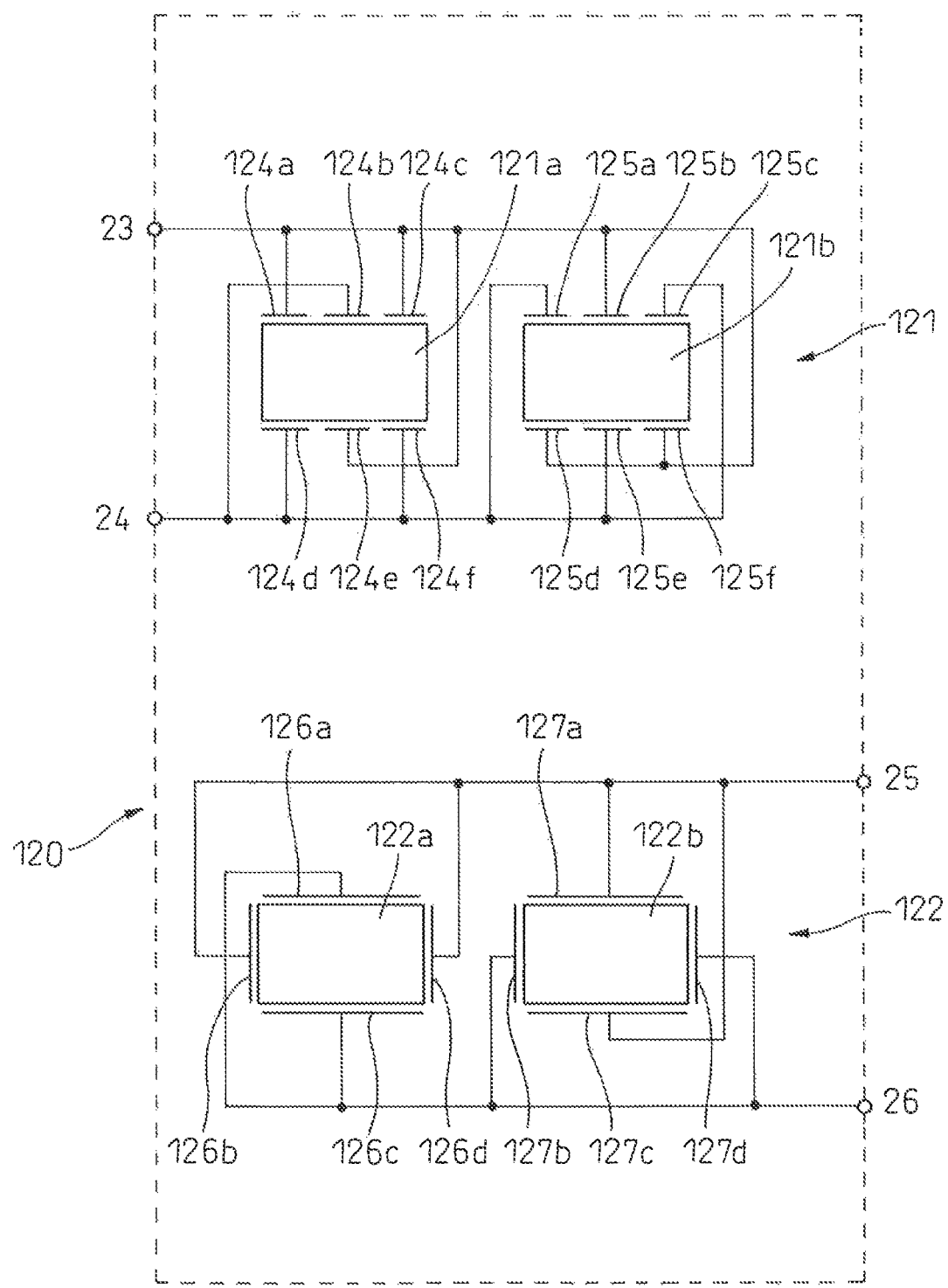
FIG. 7 is a diagram showing how various electrodes are connected to the device 120 shown in FIG. 6.

FIG. 7 is a diagram showing how various electrodes are connected to the device 120 shown in FIG. 6.

The first driving tine 121a of the first tuning-fork crystal oscillator 121 is provided with an outside driving electrode 124a, a middle driving electrode 124b, and an inside driving electrode 124c, formed on the upper face as viewed from the direction of its Z' axis, and an outside driving electrode 124d, a middle driving electrode 124e, and an inside driving electrode 124f, formed on the lower face as viewed from the direction of its Z' axis. Likewise, the second driving tine 121b of the first tuning-fork crystal oscillator 121 is provided with an outside driving electrode 125c, a middle driving electrode 125b, and an inside driving electrode 125a, formed on the upper face as viewed from the direction of its Z' axis, and an outside driving electrode 125f, a middle driving electrode 125e, and an inside driving electrode 125d, formed on the lower face as viewed from the direction of its Z' axis.

The electrodes 124a, 124c, 124e, 125b, 125d, and 125f are electrically coupled together and connected as the driving electrode 23 to the outside. On the other hand, the electrodes 124b, 124d, 124f, 125a, 125c, and 125e are electrically coupled together and connected as the driving electrode 24 to the outside.

The first detection tine 122a of the second tuning-fork crystal oscillator 122 is provided with an electrode 126a formed on the upper face as viewed from the direction of its Z' axis, an electrode 126c on the lower face, and electrodes 126 and 126d formed on both side faces. Likewise, the second detection tine 122b of the second tuning-fork crystal oscillator 122 is provided with an electrode 127a formed on the upper face as viewed from the direction of its Z' axis, an electrode 127c on the lower face, and electrodes 127b and 127d formed on both side faces.

The electrodes 126b, 126d, 127a, and 127c are electrically coupled together and connected as the detection electrode 25 to the outside. On the other hand, the electrodes 126a, 126c, 127b, and 127d are electrically coupled together and connected as the detection electrode 26 to the outside.

By applying a prescribed AC voltage Vout across the driving electrodes 23 and 24 shown in FIG. 7 from the oscillation circuit 30 shown in FIG. 3, the first driving tine 121a and the second driving tine 121b can be made to continue to vibrate in such a manner as to twist about the Y' axis in opposite phase to each other. In this case, when the voltage (corresponding to V9) output from the phase circuit 45 in the oscillation circuit 30 and the currents (corresponding to I1 and I2) output from the detection electrodes 25 and 26 connected to the second tuning-fork crystal oscillator 122 are applied to the detection circuit 50, the signal proportional to the acceleration exerted on the device 120 can be obtained from the output V28 of the detection circuit 50. In this way, the configuration of the physical quantity detection sensor according to the present invention applied to the gyro sensor 100 shown in FIGS. 3 to 5 can also be applied to the acceleration sensor. The device 120 shown as a device constituting the acceleration sensor in FIGS. 6 and 7 is only one example, and is not limited to any particular example.

Figure 8:
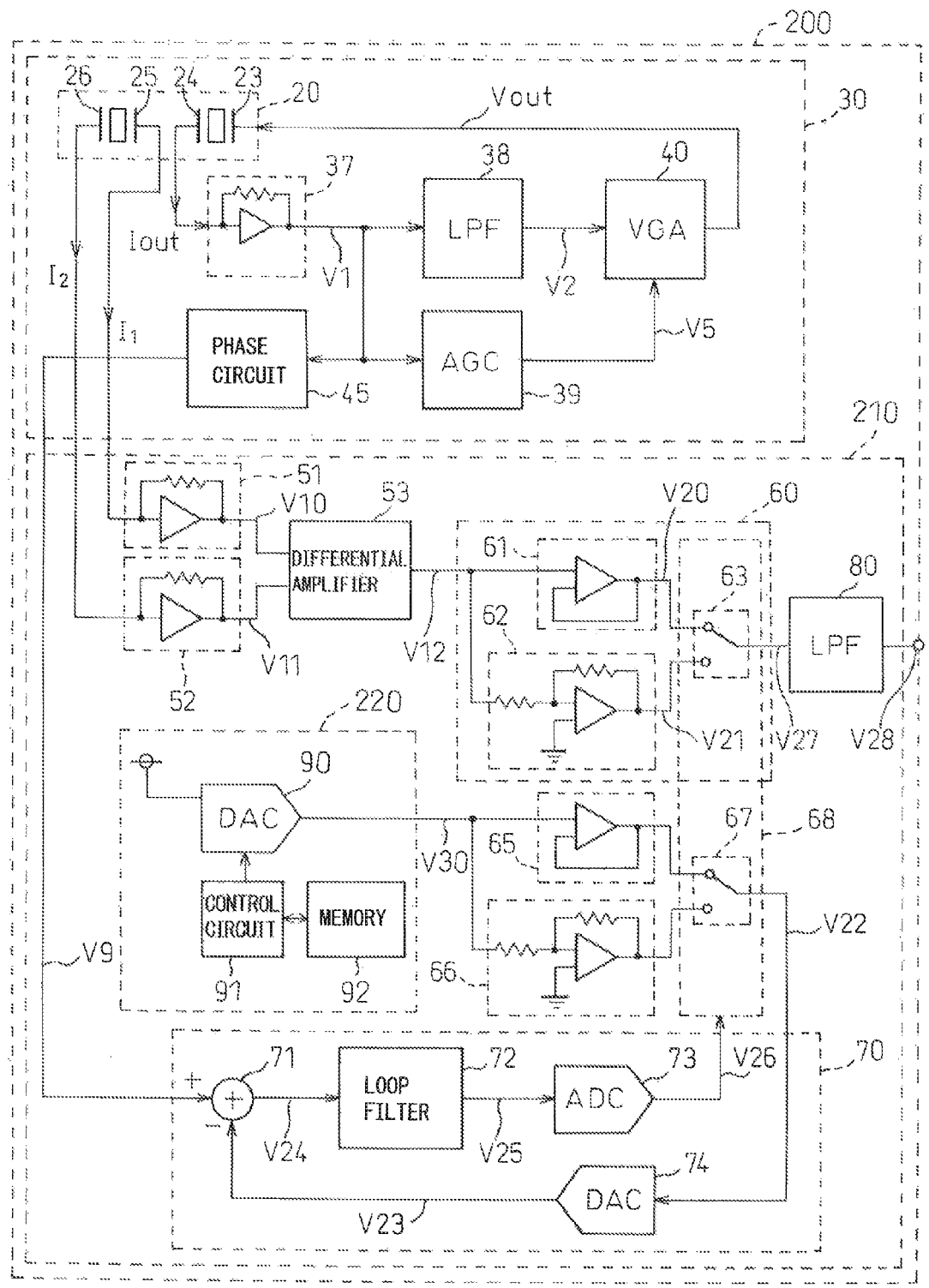
FIG. 8 is a diagram showing a gyro sensor 200 as another example of the physical quantity sensor.

FIG. 8 is a diagram showing a gyro sensor 200 as another example of the physical quantity sensor.

In the gyro sensor 200 shown in FIG. 8, the same component elements as those in FIG. 3 are designated by the same reference numerals, and such component elements will be not further described herein. The gyro sensor 200 shown in FIG. 8 differs from the gyro sensor 100 shown in FIG. 3 by the inclusion of a detection circuit 210 which contains a power supply circuit 220 capable of outputting a variable voltage, not a constant voltage, instead of the reference voltage signal (Vstd) in the detection circuit 50 of the gyro sensor 100.

The power supply circuit 220 includes a digital-analog converter (DAC) 90 connected to a reference power supply, a control circuit 91 which outputs a setting signal for setting the output of the DAC 90, and a memory 92 which stores a plurality of setting data.

In the gyro sensor 100 shown in FIG. 3, from the fact that the output signal V27 whose AC component has been removed by the LPF 80 provides the angular velocity detection signal V28 and from the earlier given equation (3), the relationships among the angular velocity detection signal V28, the voltage V10 corresponding to the signal I1 to be detected, the voltage V11 corresponding to the signal I2 to be detected, the detection signal V9, and the reference voltage signal (Vstd) can be expressed as shown by the following equation (4), $$V28=(V11-V10)V9/Vstd \qquad (4)$$

From the equation (4), it is seen that by using the output voltage V30 of the DAC 90 instead of the reference voltage signal (Vstd), and by varying the value of the output voltage V30, the gain of the angular velocity detection signal V28 can be adjusted in the gyro sensor 200. More specifically, as the output voltage V30 is increased, the value of the angular velocity detection signal V28 decreases, and as the output voltage V30 is reduced, the value of the angular velocity detection signal V28 increases.

The value of the output angular velocity detection signal V28 can vary due to differences in characteristics between each individual crystal oscillator 20. To address this, the output range is designed for the output voltage V30 so as to be able to compensate for the individual differences expected to exist in the characteristics of the crystal oscillator 20. Then, when the characteristics of the crystal oscillator 20 mounted in the gyro sensor 100 are identified, the memory 92 is updated and the output voltage V30 is set so as to compensate for the individual differences expected to exist in the characteristics of the crystal oscillator. The value to be written to the memory 92 may be determined from the characteristics of the crystal oscillator 20 itself or from the result of the measurement of the angular velocity detection signal V28. In any case, the control circuit 91 controls the DAC 90 to output the output voltage V30 best suited to the type of the crystal oscillator 20 mounted in the gyro sensor 100.

With the provision of the above power supply circuit 220, it becomes possible to output the angular velocity detection signal V28 that is substantially unaffected by the individual differences existing in the characteristics of the crystal oscillator 20. That is, the power supply circuit 220 adds a variable gain amplification function (sensitivity compensation function) to the detection circuit 210, but since there is no need to provide a dedicated variable gain amplifier circuit, there is the further advantage of being able to prevent problems such as the generation of noise and an increase in the amount of circuitry associated with the provision of a dedicated circuit.

Figure 9:
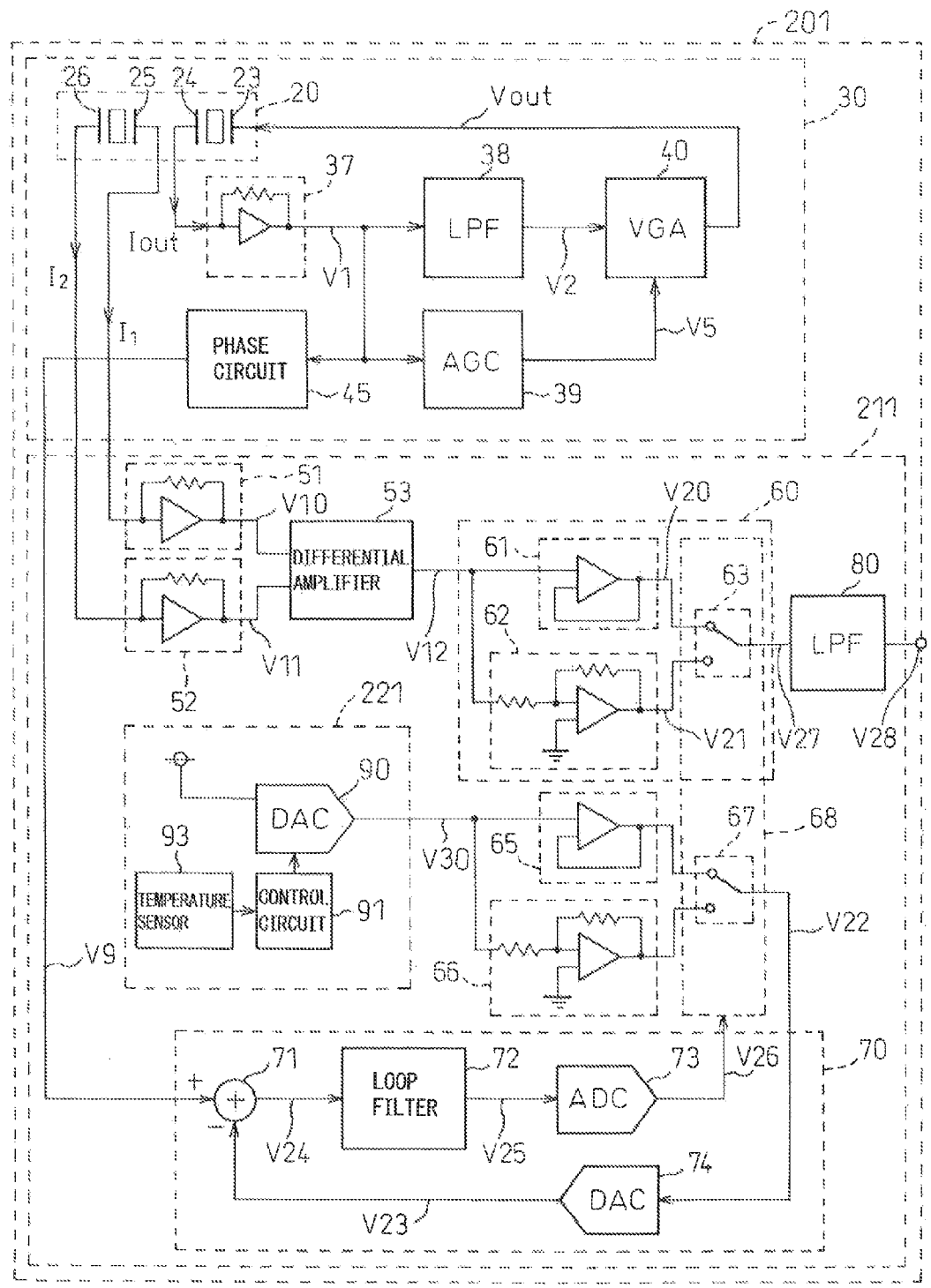
FIG. 9 is a diagram showing a gyro sensor 201 as still another example of the physical quantity sensor.

FIG. 9 is a diagram showing a gyro sensor 201 as still another example of the physical quantity sensor.

In the gyro sensor 201 shown in FIG. 9, the same component elements as those in FIG. 3 are designated by the same reference numerals, and such component elements will be not further described herein. The gyro sensor 201 shown in FIG. 9 differs from the gyro sensor 100 shown in FIG. 3 by the inclusion of a detection circuit 211 which contains a power supply circuit 221 capable of outputting a variable voltage, not a constant voltage, instead of the reference voltage signal (Vstd) in the detection circuit 50 of the gyro sensor 100.

The power supply circuit 221 includes a digital-analog converter (DAC) 90 connected to a reference power supply, a control circuit 91 which outputs a setting signal for setting the output of the DAC 90, and a temperature sensor 93 which detects the ambient temperature of the crystal oscillator 20 and outputs a temperature signal proportional to the detected temperature.

Since the characteristics of the crystal oscillator 20 are temperature dependent, when the ambient temperature changes, the value of the output angular velocity detection signal V28 changes correspondingly. In view of this, the control circuit 91 varies the output of the DAC 90 in accordance with the output from the temperature sensor 93.

With the provision of the above power supply circuit 221, it becomes possible to output the angular velocity detection signal V28 that is substantially unaffected by the temperature characteristics of the crystal oscillator 20. That is, the power supply circuit 221 adds a temperature compensation function to the detection circuit 211.

Figure 10:
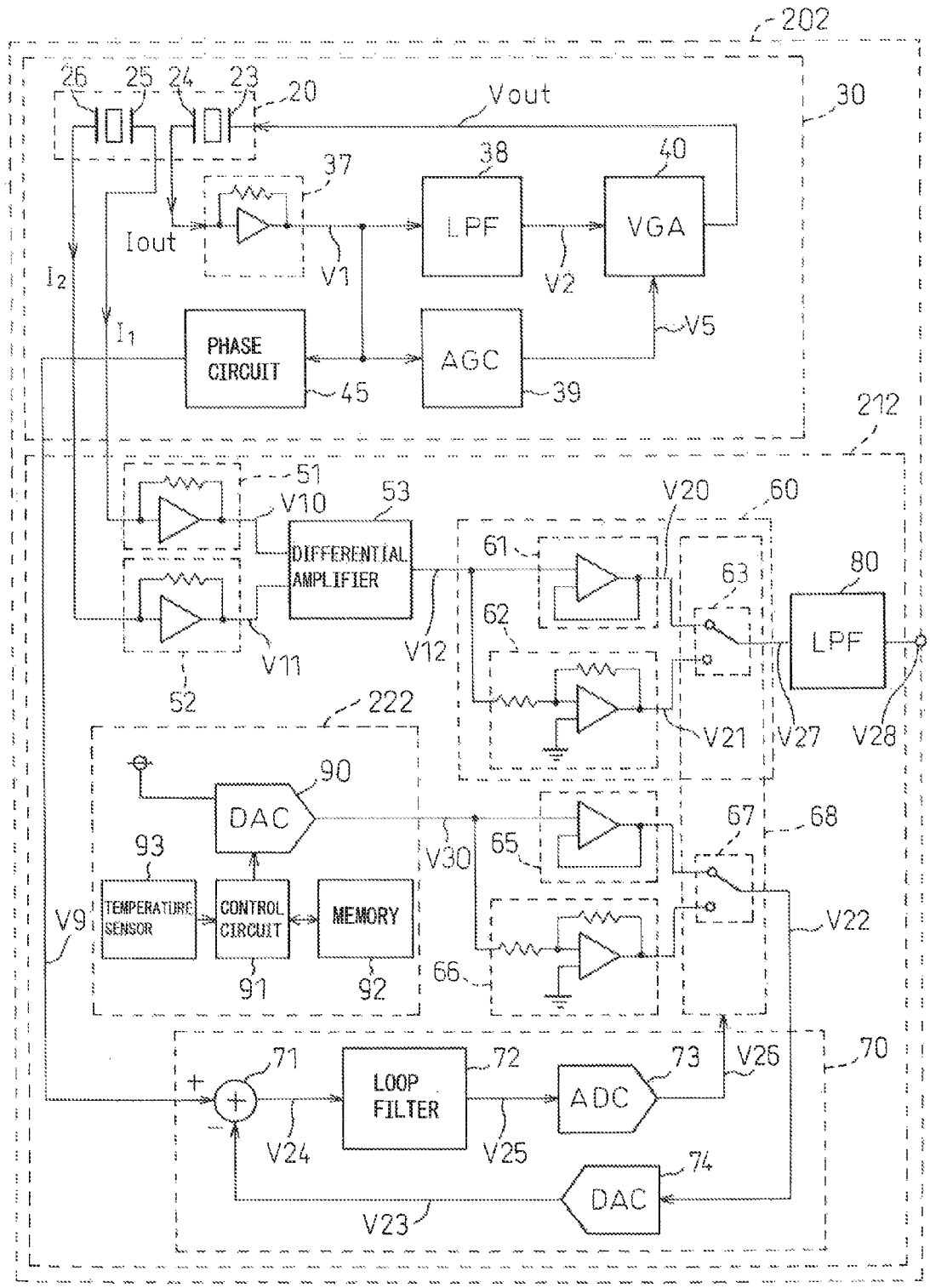
FIG. 10 is a diagram showing a gyro sensor 202 as yet another example of the physical quantity sensor.

FIG. 10 is a diagram showing a gyro sensor 202 as yet another example of the physical quantity sensor.

In the gyro sensor 202 shown in FIG. 10, the same component elements as those in FIG. 3 are designated by the same reference numerals, and such component elements will be not further described herein. The gyro sensor 202 shown in FIG. 10 differs from the gyro sensor 100 shown in FIG. 3 by the inclusion of a detection circuit 212 which contains a power supply circuit 222 capable of outputting a variable voltage, not a constant voltage, instead of the reference voltage signal (Vstd) in the detection circuit 50 of the gyro sensor 100.

The power supply circuit 222 includes a digital-analog converter (DAC) 90 connected to a reference power supply, a control circuit 91 which outputs a setting signal for setting the output of the DAC 90, a memory 92 which stores a plurality of setting data, and a temperature sensor 93 which detects the ambient temperature of the gyro sensor 202 and outputs a temperature signal corresponding to the detected temperature.

In the power supply circuit 222, in order to compensate for the temperature dependence of the crystal oscillator 20 as well as the individual differences in the characteristics thereof, the memory 92 stores data of the characteristics of the crystal oscillator, and the temperature sensor 93 is provided for compensating for the temperature characteristics of the crystal oscillator. Accordingly, the power supply circuit 222 outputs the output voltage V30 that has been corrected by the temperature signal from the temperature sensor 93 on the basis of the voltage corresponding to the characteristics of the crystal oscillator 20 stored as data in the memory 92. Differences in temperature characteristics between each individual crystal oscillator may also exist. In view of this, the output voltage 30 corrected by the temperature signal from the temperature sensor 93 may be further corrected by the control circuit 91 so as to compensate for the individual differences existing in the temperature characteristics of the crystal oscillator.

With the provision of the above power supply circuit 222, it becomes possible to output the angular velocity detection signal V28 that is substantially unaffected not only by the individual differences existing in the characteristics of the crystal oscillator 20 but also by the temperature characteristics thereof. That is, the power supply circuit 222 serves to add a variable gain amplification function (sensitivity compensation function) and a temperature compensation function to the detection circuit 212.

The gyro sensors 100, 200, 201, and 202 described above have been configured to detect the difference signal V12 by using the digital signal that is converted from the detection signal V9 by the delta-sigma modulator 70. Alternatively, the gyro sensors may be configured to detect the detection signal V9 by using a digital signal that is converted from the difference signal V12 by the delta-sigma modulator 70.

Further, the gyro sensors 100, 200, 201, and 202 described above may be configured to detect the difference signal V12 by using a digital signal that is converted from an inverted version of the detection signal V9 by the delta-sigma modulator 70, or may be configured to detect the detection signal V9 by using a digital signal that is converted from an inverted version of the difference signal V12 by the delta-sigma modulator 70.

The physical quantity sensor described above can be applied advantageously to a sensor, such as a gyro sensor or an acceleration sensor, that measures a physical quantity by using a crystal oscillator.

What is claimed is:

1. A physical quantity sensor comprising:
    an oscillator for converting an externally applied physical quantity into an electrical signal;
    an oscillation circuit for causing said oscillator to oscillate, and for outputting a detection signal and a to-be-detected signal from said oscillator;
    a delta-sigma modulator for delta-sigma modulating either one of said detection signal and said to-be-detected signal, and for outputting a modulated signal;
    a detector circuit for detecting the other one of said detection signal and said to-be-detected signal by using said modulated signal, and for outputting a outputted signal;
    a variable voltage source capable of varying an output voltage in accordance with the individual differences of said oscillator; and
    a control unit for controlling said output voltage of said variable voltage source,
    wherein said delta-sigma modulator performs said delta-sigma modulation by using a feedback signal created based on said output voltage.

2. The physical quantity sensor according to claim 1, further comprising a memory for storing data in accordance with said oscillator,
    wherein said control unit controls the output voltage of said variable voltage source, based on said data.

3. The physical quantity sensor according to claim 1, further comprising a temperature sensor for detecting an ambient temperature of said oscillator,
    wherein said control unit controls the output voltage of said variable voltage source, based on an output of said temperature sensor.

4. The physical quantity sensor according to claim 1, further comprising:
    a memory for storing data in accordance with said oscillator; and
    a temperature sensor for detecting an ambient temperature of said oscillator,
    wherein said control unit controls the output voltage of said variable voltage source, based on said data and on an output of said temperature sensor.

5. The physical quantity sensor according to claim 1, further comprising a low-pass filter for removing an AC component from said output signal of said detector circuit.

6. The physical quantity sensor according to claim 5, further comprising a second switching circuit for outputting, based on said modulated signal supplied from said delta-sigma modulator, either one of the output voltage of said variable voltage source and an inverted version of the output voltage of said variable voltage source,
    wherein the signal output from said second switching circuit is used as said feedback signal.

7. The physical quantity sensor according to claim 1, wherein said detector circuit further includes a first switching circuit for outputting, based on said modulated signal, the other one of said detection signal and said to-be-detected signal, or an inverted version of the other one of said detection signal and said to-be-detected signal.

* * * * *